(12) United States Patent
Chao et al.

(10) Patent No.: US 6,325,632 B1
(45) Date of Patent: Dec. 4, 2001

(54) COMPUTER-AIDED LEARNING METHOD AND SYSTEMS MATCHING STUDENTS WITH INSTRUCTORS

(75) Inventors: David Chao, Towson, MD (US); Hsien Tsung Chang, Taipei (TW); Peter P. Tong, Mountain View, CA (US)

(73) Assignee: Anabas, Inc., San Francisco, CA (US)

( * ) Notice: Subject to any disclaimer, the term of this patent is extended or adjusted under 35 U.S.C. 154(b) by 0 days.

(21) Appl. No.: 09/305,406

(22) Filed: May 5, 1999

(51) Int. Cl.[7] .............................. G09B 7/00; G09B 19/00; G06F 17/60
(52) U.S. Cl. .................... 434/322; 434/118; 434/323; 434/362; 705/52; 706/927
(58) Field of Search ..................................... 434/156, 157, 434/219–262, 322–323, 362, 118; 705/32, 52, 80, 400; 706/927, 934; 709/204, 205; 704/1

(56) References Cited

U.S. PATENT DOCUMENTS

| | | | |
|---|---|---|---|
| 5,727,951 | 3/1998 | Ho et al. ............................... | 434/362 |
| 5,743,743 | 4/1998 | Ho et al. ............................... | 434/236 |
| 5,743,746 | 4/1998 | Ho et al. ............................... | 434/332 |
| 5,764,958 | 6/1998 | Coskun ................................. | 395/500 |
| 5,779,486 | 7/1998 | Ho et al. ............................... | 434/353 |
| 5,810,605 | 9/1998 | Siefert ................................... | 434/362 |
| 5,836,711 | 11/1998 | Ho et al. ............................... | 434/362 |
| 5,862,223 | 1/1999 | Walker et al. ......................... | 380/25 |
| 5,863,208 | 1/1999 | Ho et al. ............................... | 434/362 |
| 6,023,729 | 2/2000 | Samuel et al. ........................ | 709/228 |

OTHER PUBLICATIONS

Internet, http://www.peritas.com/noframes/home.html, *Peritas Online Home Page*, 1998.
Internet, http://www.centra.com/product/index.html, *Symposium, by Centra Software*, 1997.

*Primary Examiner*—John Edmund Rovnak
(74) *Attorney, Agent, or Firm*—Blakely, Sokoloff, Taylor & Zafman LLP

(57) ABSTRACT

A computer-aided learning method and apparatus allowing a student to select an instructor from many instructors to learn a subject, and vice versa. Each user has an identifier. The apparatus can include a determinator, a search engine, a session manager, an account manager, a categorizer, and a storage medium. The determinator determines the type of user based on at least the identifier of the user. If the user is a student, the search engine identifies the instructor based on information previously stored in the storage medium regarding the instructors; the session manager manages a session between the student and the identified instructor for learning the subject; and the account manager processes an account based on the duration of the session for collecting a payment from the student to pay the instructor. If the user is an instructor, based on inputs from the instructor, the categorizer generates the instructor's profile to be identified.

45 Claims, 10 Drawing Sheets

```
Search the
Storage Medium  ~ 250
      |
Generate the
 Best Match    ~ 252
```

Figure 6

COMPUTER-AIDED LEARNING METHOD AND SYSTEMS MATCHING STUDENTS WITH INSTRUCTORS

BACKGROUND OF THE INVENTION

The present invention relates generally to computer-aided learning methods and systems and more particularly to remotely allowing a student to select an instructor to learn a subject through a computer.

We are living in a global environment where we need to learn to work with people from different parts of the world to get things done. Just using a computer as an example, it is not uncommon that its printed circuit boards are fabricated in Taiwan; monitors are manufactured in Japan; application programs are written in India; and the final products—the computers—are sold in the United States.

The penetration of the World Wide Web (Web) to almost all sectors of the society has further enhanced this global aspects. It will not be long that more products will be sold and more services rendered on the Web than on many other distribution channels.

The global market has significantly increased the value of information, which might have become one of the most important global commodities. We need to learn from and to work with people from other parts of the world.

One of the best ways to learn from and to work with someone is to speak their language and to understand their culture. It would make the process much smoother and more productive. This implies that we should learn foreign languages. However, identifying the right instructor to learn a different language is not an easy task.

In China, the need to learn English is phenomenal, especially for the younger generation. They know that English is one of the, if not the, most important languages to learn. Being proficient in English will open many doors for them. A language tutoring class with a Caucasian instructor can automatically charge a premium because the perception is that a Caucasian is a better English teacher.

Though the best instructor to teach a foreign language may be a person whose mother tongue is that language, typically, such person does not live in your neighborhood. For example, compared to the huge population in China, there are very few instructors with English as their native language living in China. The major English-speaking population is concentrated thousands of miles away. The need is high, but the supply is very low.

It should be apparent from the foregoing that there is a need for a medium that would bring large number of English-speaking instructors to the even larger number of students thousands of miles away, and to help match them together.

SUMMARY OF THE INVENTION

The present invention provides methods and apparatus that match students with instructors that do not have to live in similar neighborhoods. In one embodiment, the students want to learn a foreign language. There are many potential excellent instructors who live thousands of miles away. The challenge is to find the instructors that can satisfy the students, and to find the students that fit the needs of the instructor.

We have different needs. For students, some might be interested in learning elementary English, just sufficient to get by as a tourist. Other might like to make sales presentation in English to potential customers. Another group not only wants to learn how to communicate orally, but also in writing. Some can only learn at night, after work. Others can only learn from around 1 pm to 3 pm when their kids are taking a nap. Some do not care about tuition, as long as the instructor is good. Others only want a reasonable product at a reasonable rate.

Typically, we select instructors based on reputation and recommendation. People attend a good school because it has a good name. Although there are tremendous number of good English instructors in the United States, identifying a good one, thousands of miles away is not an easy task, let alone identifying the one that fits one's individual needs.

Regarding instructors, some might like to teach, but only from 9 am to 11 am, Monday to Thursday, excluding major holidays. They might have retired, and treat teaching as another source of income. For another group, they like to talk to people from a different culture, and getting paid is not that important to them. There are also a group of top instructors who would not contemplate teaching unless they are very well-paid. They do not mind teaching students faraway, as long as they do not have to worry about administrative details, such as payments. For students living hundreds of miles away, it would be a challenge to collect delinquent payments.

One embodiment of the present invention creates a medium that allows students to select instructors who can reside in a very different neighborhood. The embodiment can automatically identify instructors based on the needs and preferences of students. It can also establish the medium of communication to allow them to get acquainted and to start the learning sessions. In addition, the embodiment monitors the communication sessions, processes the billing, and collects payment from the students to pay the instructors. In another embodiment, instructors, based on their interests, can also identify their students of choice.

In one embodiment, the apparatus includes a search engine, a session manager, an account manager, and a categorizer. It allows a student user select an instructor user to learn a language based on information regarding many instructor users previously stored in a storage medium.

After a user enters his user identification into the embodiment, if he is a student, the search engine allows him to search information regarding instructors in the storage medium to select at least one instructor he desires to learn the language from. Then, the session manager establishes a communication connection between the student and the at least one instructor selected. The session manager also monitors the session, such as determining when the session is over. Later, the account manager collects from the student to pay the instructor based on the monitored information. In this embodiment, if the user is an instructor, the categorizer allows him to enter at least one piece of personal information into the storage medium to be searched by students.

Conversely, in another embodiment, the apparatus allows an instructor to select a student to teach a language based on information regarding many students previously stored in the storage medium. In yet another embodiment, the apparatus automatically matches students with instructors based on their interest and preferences.

In one embodiment, students and instructors, located in very diverse locations, can be matched based on their individual needs and interests. For example, students in China can be matched to instructors in the United States, or vice versa. A physically-handicapped instructor does not have to leave his comfort zone to teach—He can teach from his home.

In another embodiment, the matching process can be based on the personal profiles of the users, and can be done automatically. After the matching, the embodiment can establish sessions to allow the users to further negotiate to determine if they really fit. If they decide that they would like to work together, the embodiment can establish sessions for them at their desired time, and monitor the sessions accordingly. The embodiment can process the paperwork contemporaneously and collect payments from the students. The payments can depend on the duration of use. The instructors do not have to worry about administrative details. Furthermore, based on past usage, the embodiment can provide differential billing to different users. Information on learning records can also allow students to find out the reputation of instructors, and vice versa.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 6 shows one set of steps performed for identification in the present invention.

Same numerals in FIGS. 1–10 are assigned to similar elements in all the figures. Embodiments of the invention are discussed below with reference to FIGS. 1–10. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
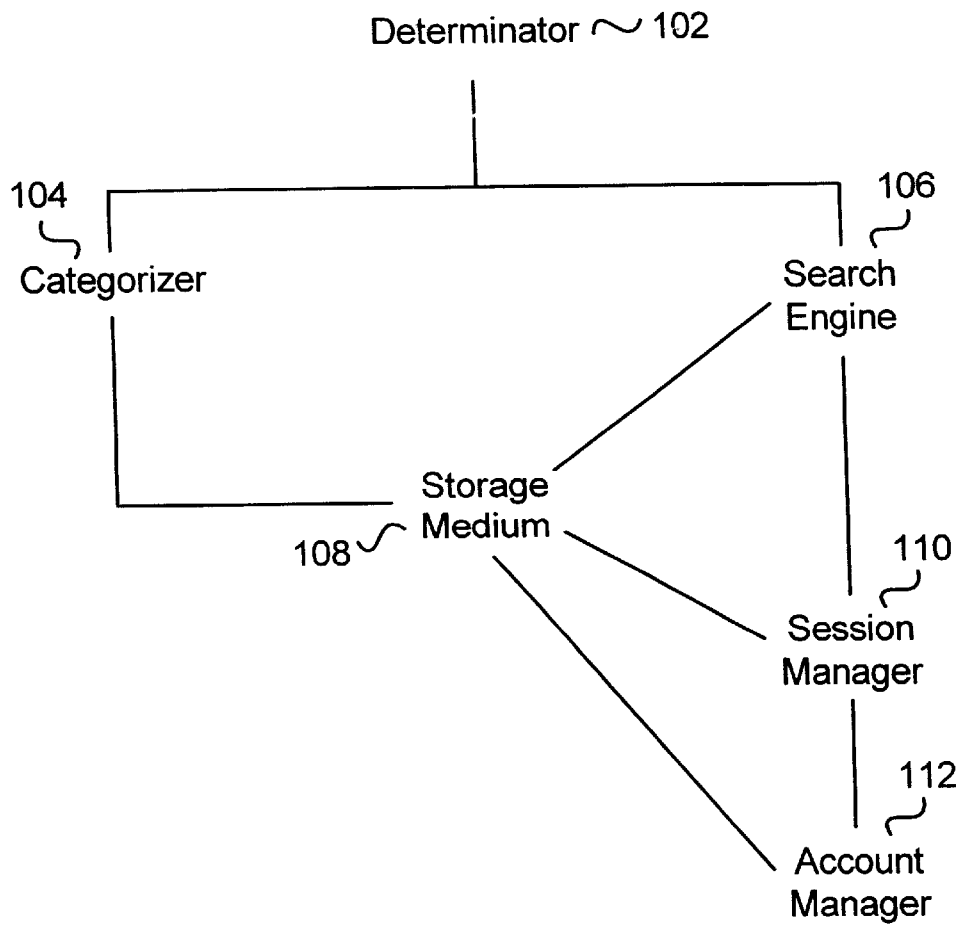
FIG. 1 shows an embodiment of the present invention.
Figure 2:
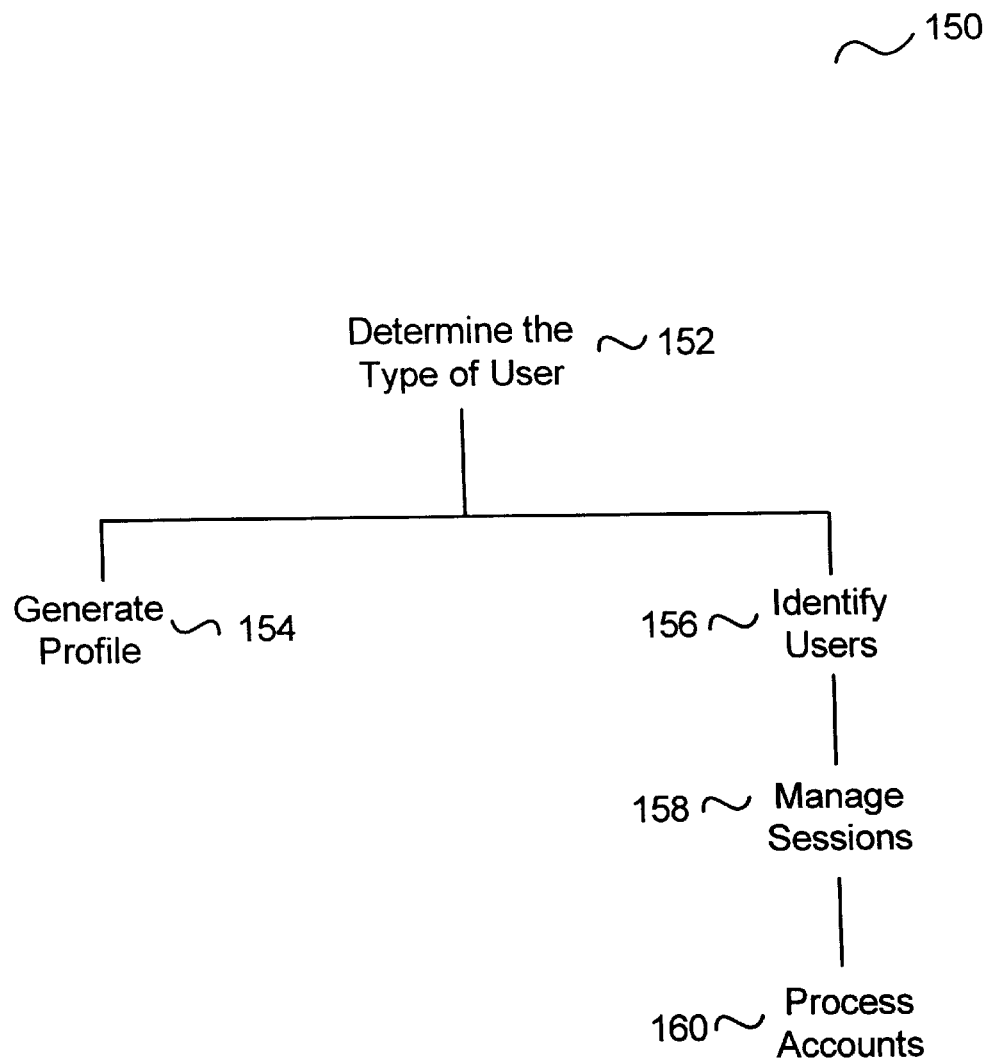
FIG. 2 shows one set of steps to implement an embodiment of the present invention.

FIG. 1 shows an embodiment 100 of the present invention to implement one set of steps 150, as shown in FIG. 2. The embodiment includes a categorizer 104 to generate user profiles (Step 154); a search engine 106 to identify one or more users based on some rules (Step 156); a storage medium 108; a session manager 110 to manage sessions (Step 158); and an account manager 112 to process accounts (Step 160).

Figure 3:
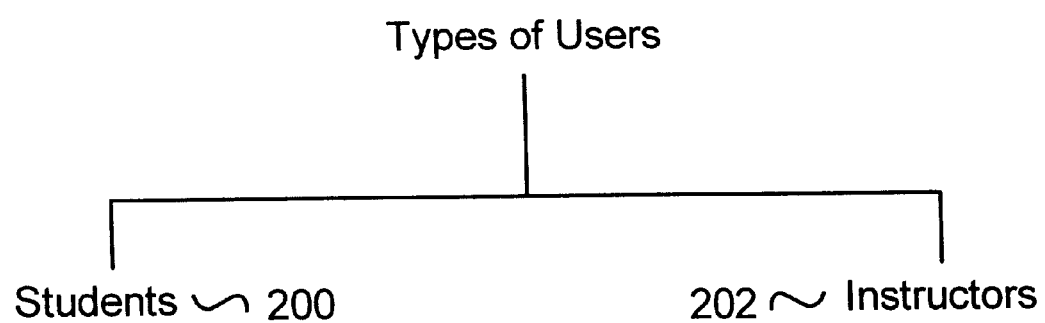
FIG. 3 shows examples of types of users for the present invention.

In another embodiment, the apparatus also includes a determinator 102 to determine on the type of users based on information entered by users (Step 152). FIG. 3 shows two types of users for the present invention, namely students, 200, and instructors, 202. There can be other types of users, such as system administrators.

Typically, to use an embodiment of the invention, the user enters his user identification. This can be done in many ways. For example, his identification can be his real name, a code name, his fingerprint or other biometric identifier.

If the user is a first time user, the user can choose his user identification to be entered into the system, which can ask for his subject of interest and whether he is a student or an instructor of that subject. Such information can be stored in the storage medium 108. A user can be an instructor of one subject and a student of another.

Figure 4:
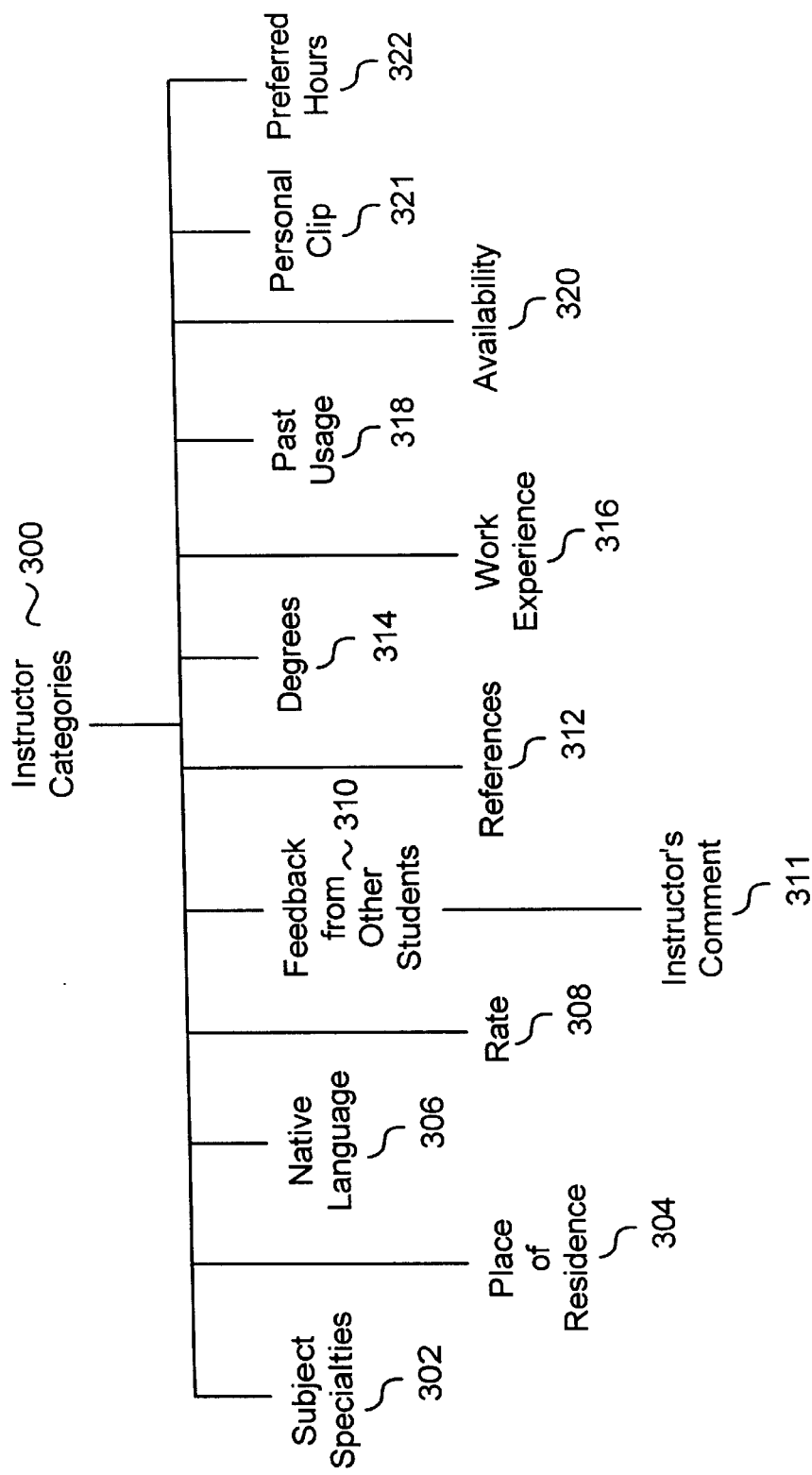
FIG. 4 shows examples of different areas to categorize instructors.

As an example, he wants to teach a subject. When asked by the apparatus, the user responds that he is an instructor of that subject. In one embodiment, he is then asked a number of questions to generate his profile, and to have his profile categorized accordingly. At least one piece of information about him can be stored in the storage medium for identifying him later to teach a subject. FIG. 4 shows a number of categories for the instructor's profile. There can be a dialog box for each category, and the dialog box can have a list of entries. For example, one category is the subject the instructor is interested in, which, in this case, is his subject of specialty, 302. A list of entries can show up, such as teach to speak English, and teach to speak Spanish. The user can check off the subject he can be an instructor, or his subject of interest. For example, he can check off the box to teach to speak English.

He can also be asked for his place of residence, 304, his native language, 306, his degrees, 314, his previous work experience, 316, his preferred hours to teach 322, and his rate 308, which can be a fixed or an hourly rate. He may be asked to send in a personal clip, 321, about himself In this invention, a personal clip can be a picture; an audio stream; a video stream; a html page; a Web page; a multimedia stream or other file formats; or some combination of the above; about himself. If he is not available for the next two weeks, but would be free afterwards, he can enter such availability information, 320, into the system.

He may also enter his references, 312. This can be done as a narrative, with names and their email addresses. The references can be feedbacks from prior students, 310, whom he previously taught using the system. Such feedbacks do not have to be entered by him, but by other students after their classes with him. Such feedbacks again can be a narrative by those students, and can include the students' email addresses. There can be an indicator indicating whether each of the feedbacks was solicited by him or requested by the system. Because of the feedbacks, his reputation stays with him. In one embodiment, he is allowed to comment, 311, on the feedbacks. In one embodiment, the instructor also has a category describing his past usage 318. Such information builds the profile of the instructor.

In one embodiment, the categories are used to build a hierarchy. For example, the peak of a hierarchy is a group of English teachers. The nodes connected to that peak node include two separate sub-nodes. One sub-node is for those instructors whose native language is English, and the other is not. Below each of the sub-node is four sub-sub-nodes, grouping instructors based on their rates. Such a hierarchical structure enhances searching efficiency.

Figure 5:
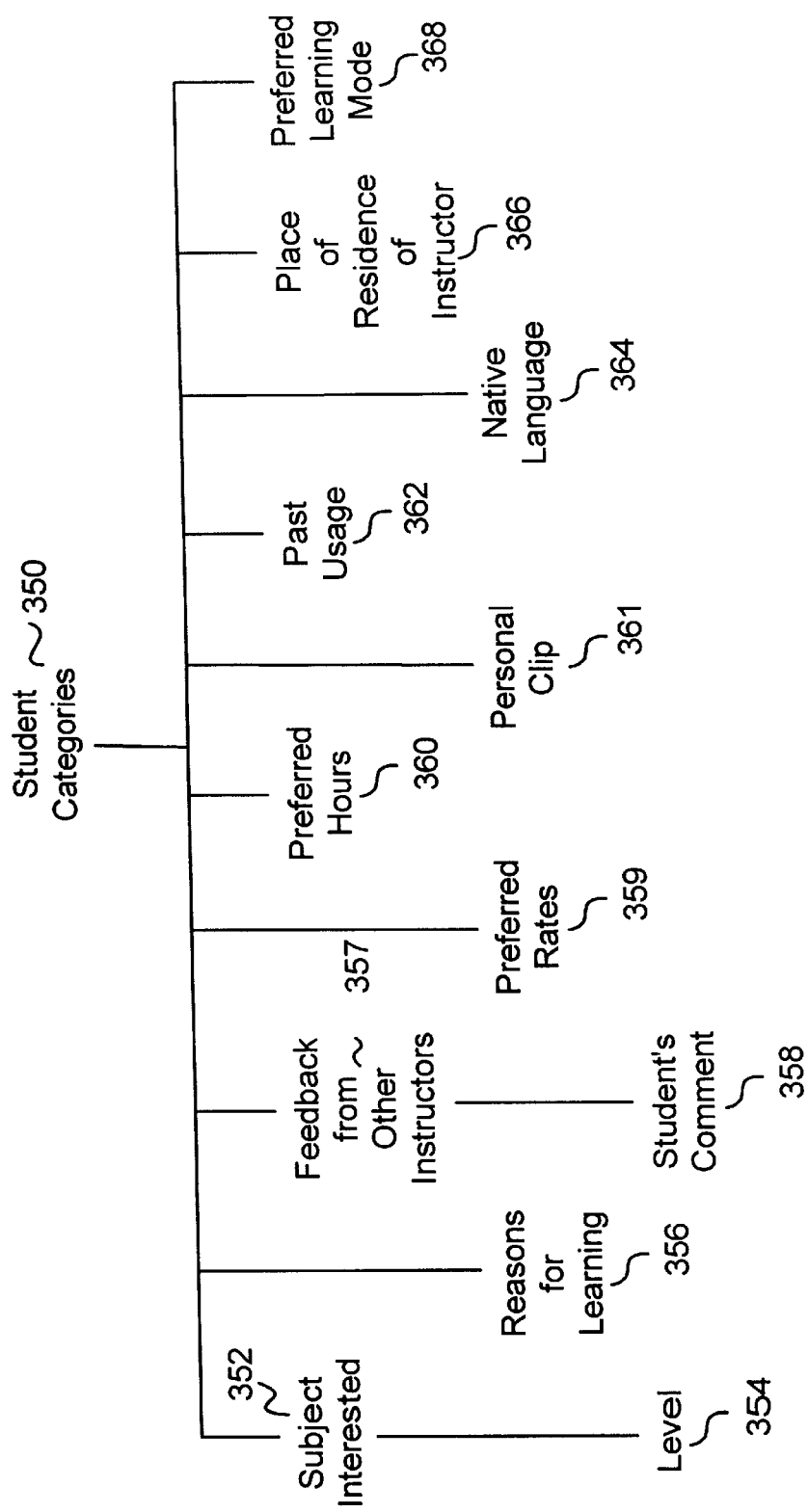
FIG. 5 shows examples of different areas to categorize students.

In another embodiment, the user is a student. His characteristics again can be categorized. FIG. 5 shows examples of different categories of the student, 350. They can include the subject he is interested in, which in this case, is the subject he wants to learn, 352; and can include his present level on the subject, 354, such as kindergarten or high school. Other categories can include the reasons of his learning, 356; his preferred rates, 359; his preferred work hours, 360; his personal clip, 361; his native language, 364; the preferred place of residence of his instructor, 366; and the preferred learning mode, 368, such as through audio-conferencing or video-conferencing.

Another category is feedbacks from prior instructors, 357, whom he previously learnt from using the system. Such feedbacks can be a narrative by those instructors, and include the instructors'email addresses. Based on the feedbacks, his reputation stays with him. In one embodiment, he is allowed to comment, 358, on the feedbacks.

In another embodiment, the system also keeps track of his place of residence. His past usage of the system, 362, can also be included. Such information builds the profile of the student user.

Going back to the example of a student user, after the student enters his characteristics into the system, the search engine 106 can automatically identify the instructor for the student. This can be done by searching the storage medium, 250, and generating the best match, 252, based on instructors available in the storage medium, as shown in FIG. 6. For example, the student's information includes the following:

(A) Place of residence of the instructor—United States;

(B) Subject of interest—Speak English;

(C) Preferred rate—<$25 an hour; and (D) Preferred hours—8 pm to 10 pm in the student's time zone.

The search engine can automatically match the student's interest with instructors having the same characteristics.

In one embodiment, the student can include a weight next to some of the categories he entered. For example, next to a category, there is a set of weights entries, as follows:

(I) Utmost Important (II) Very Important (III) Important (IV) Desirable

The student can check the appropriate box next to the category. Then, the search engine performs the matching of the utmost important category first and goes on down.

A number of rules can be used to generate the best match if there is no exact match. For example, if the student's preferred rate is X or less, and no instructor has that rate, then the search engine looks for the rate of X+5. Such rules should be obvious to those skilled in the art, and would not be further described in this application.

In another embodiment, students can be matched to the instructor's characteristics. For example, after the instructor has entered his characteristics into the system, the search engine can search and perform the best match with information of students in the storage medium.

In yet another embodiment, the search engine produces a number of matched results. It would then be up to the user to select the one or more he desires. The user can be allowed to access information in each of matched results to get additional data. For example, going back to the example of the student user, assume that the search engine produces 5 instructors. The student can then access the characteristics of the 5 instructors to make his decision. He can access the personal clip of the instructors, if they have one. In one embodiment, all of the information in the categories shown in FIG. 4 is accessible, except past usages, 318. Based on the accessed information, the student can select a number of instructors, such as 2.

After the student has selected the one or more instructors, or vice versa, the session manager can establish a session, 408, between the student and each of the instructors. If the student or the instructor is not available, the session manager can send an email to that party to establish a convenient time for them to communicate.

Figure 7:
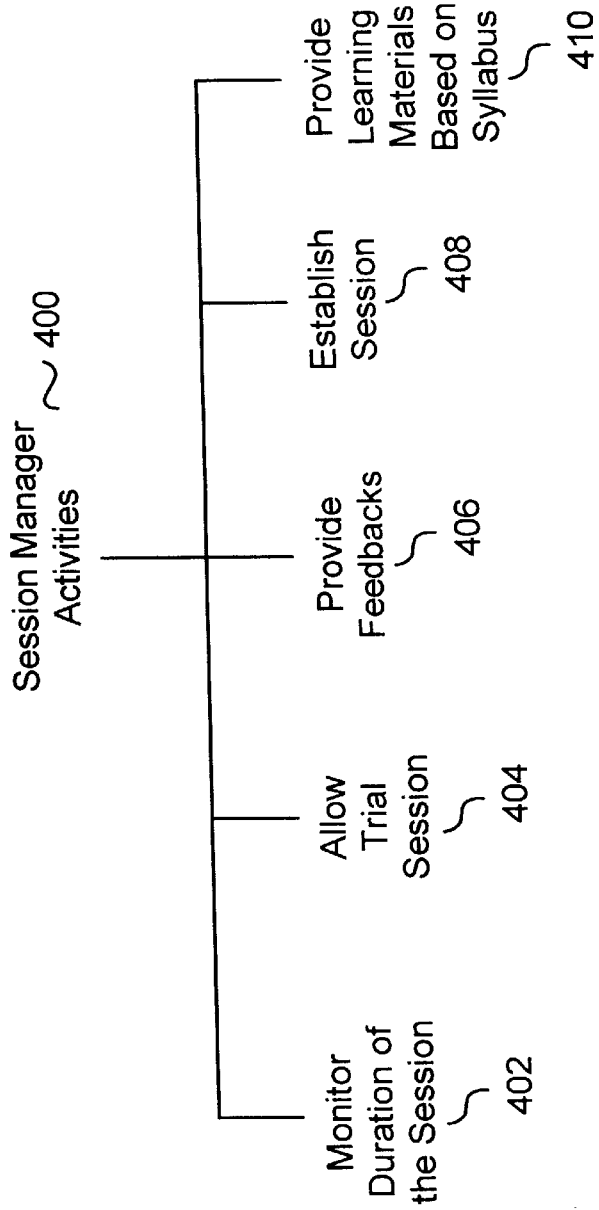
FIG. 7 shows examples of activities performed by a session manager of the present invention.

FIG. 7 shows a number of activities 400 that can be performed by the session manager. For example, the session manager can monitor the duration of the sessions, 402, and allow for trial or negotiation session, 404.

The trial session permits the student to communicate with each of the instructors for a duration of time, such as 30 minutes, before he has to decide on the instructor he wants to learn from. During the session, they may change the payment schedule, such as going for a fixed rate, instead of an hourly rate. The student and the instructors can communicate through email to determine the time of their trial session. After the time is set, the session manager can establish the session. Methods to establish and monitor sessions by computers should be obvious to those skilled in the art and will not be further described.

Other session manager activities include providing feedbacks regarding the user. For example, at the end of learning a subject from the instructor, the session manager can send a questionnaire to the student, asking him to provide some feedbacks regarding the instructor. Such student feedback information 310 can be included as the characteristics of the instructor. In another embodiment, the instructor is allowed to review the feedback, and comment on them.

In one embodiment, the session manager can provide learning materials based on a syllabus, 410, for the student and the instructor to follow. For example, the English instructor can teach the student to speak English based on texts provided by the session manager. The text can be shown on monitors before the instructor and the student.

The student can try to learn from the selected instructor, or the instructor can try to teach the selected student, at any time. This can be done, for example, by the student sending his identification, his subject of interest and a request to the apparatus 100, to have a session with the instructor. If the instructor accepts, the learning session can start, and the session manager can monitor the process.

Also, a learning session does not have to be limited to one instructor and one student. One student can have more than one instructor, or vice versa. This is up to the students and the instructors. Establishing and monitoring such communication sessions should be obvious to those skilled in the art, and will not be further described.

Figure 8:
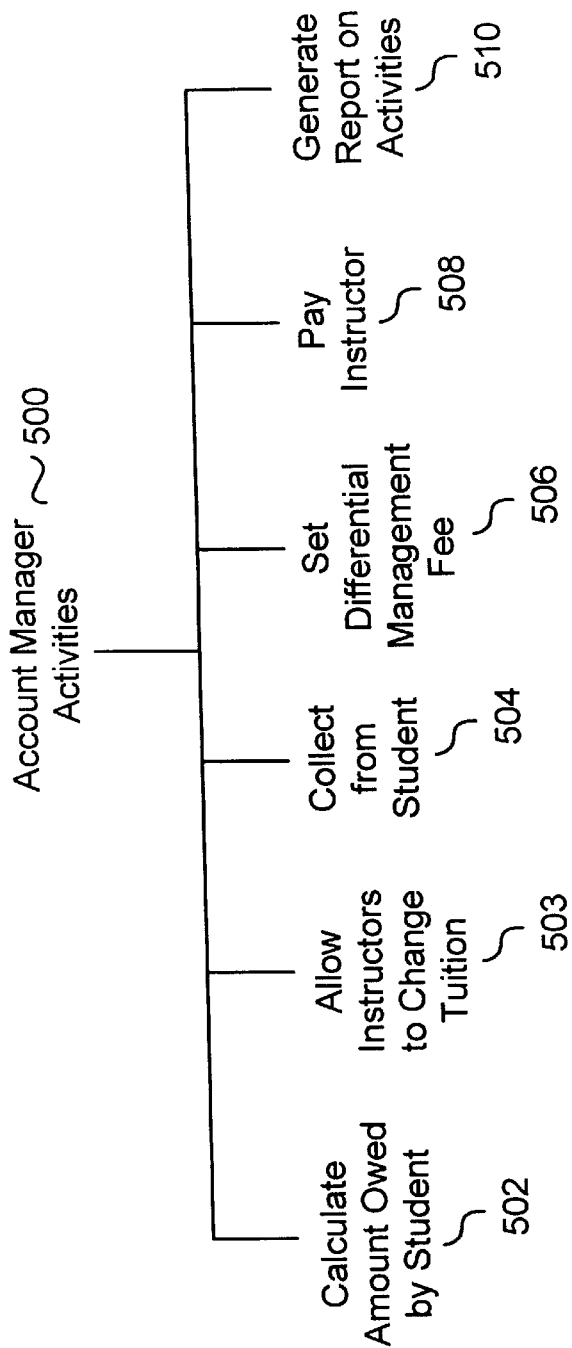
FIG. 8 shows examples of activities performed by an account manager of the present invention.

Information monitored by the session manager can be stored in the storage medium, which can include a database. The account manager can generate reports on the monitored activities, 510. FIG. 8 shows examples of other activities, 500, that can be performed by the account manager. For example, the account manager can calculate, 502, the amount owed by the student based on the duration of the sessions and the rate of the instructor. The account manager can collect from the student, 504, by sending the student bills for paying the instructor, 508.

In one embodiment, the account manager extracts a fixed percentage from the payment to the instructor as management fee. This management fee does not have to be fixed. The account manager can set differential management fees, 506. For example, the first 50 hours of instruction, the management fee is 1% of the instructor's payment; and the second 50 hours, the management fee is 0.75%. In yet another embodiment, an instructor can change, 503, the amount of tuition his student has to pay. In one embodiment, if the tuition goes down based on negotiations between the instructor and the student, the management fee stays the same. But if the tuition goes up, the management fee goes up accordingly.

Figure 9:
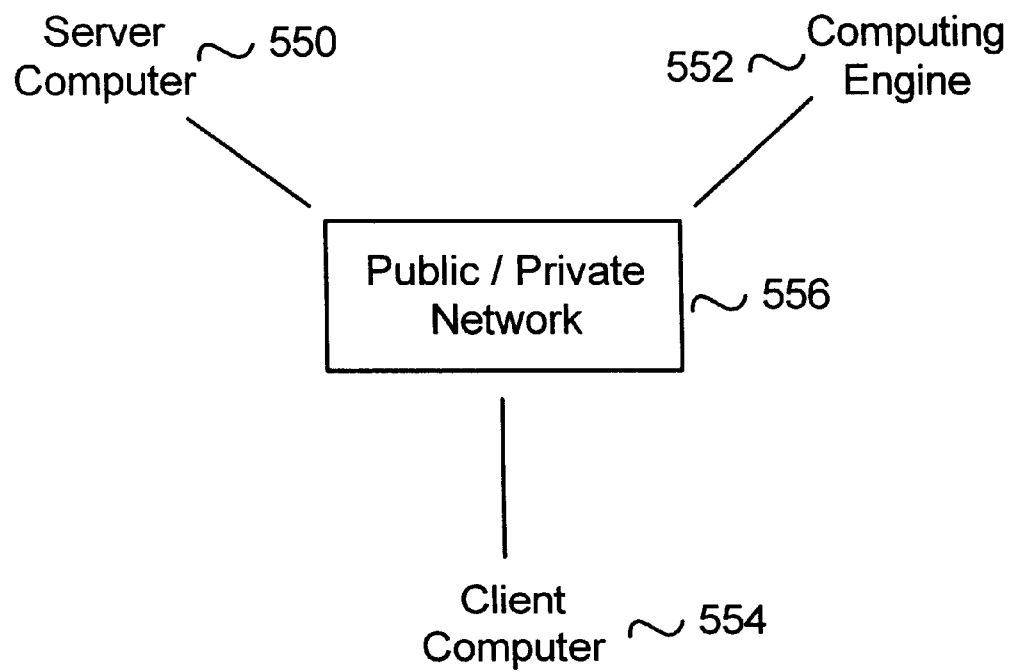
FIG. 9 shows computers networked to implement one embodiment of the invention.

FIG. 9 shows computers networked to implement one embodiment of the invention. Different elements in the present invention may be in different physical components. For example, the embodiment 100 can be in a computer, such as a server computer 550, which is accessed by student users and instructor users with client computers, 554 or other computing engines 552, through a network, 556. The computers can have network interface adapters to gain access to the network. The network can be a public network, such as the Internet; a private network, such as an intranet; or a public/private network. Each computer can include a digital camera for video-conferencing, or a head set for audio-conferencing. In one embodiment, a computer is an apparatus, an engine or a substance that can compute, and the computer is at least partially designed by a human being.

In another embodiment, the determinator is in a client computer. After the determinator determines that the user is a student or an instructor of the subject of interest, such information is transmitted to a server computer to act accordingly. In yet another embodiment, a client computer can have both the determinator and the categorizer.

In yet another embodiment, a client computer, or a computer, can be a thin client with minimal computation and memory power. For example, it includes an output device, such as a small screen or a speaker; an input device, such as a digital camera, a key pad, or a speech recognizer that receives and transforms analog speech to digital signals; and a connectivity device to couple the computer to a network. Such a thin client can be a computer or computation engine used by a student to connect to a server computer, which manages a session to connect with another computer used by an instructor.

Figure 10:
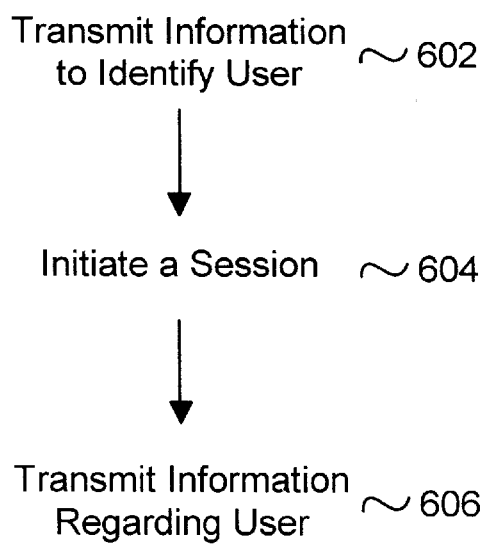
FIG. 10 shows a set of steps to implement another embodiment of the present invention.

FIG. 10 shows a set of steps 600 to implement another embodiment of the present invention. This embodiment can use such a thin client, for example by a student. The thin client or a first computer transmits a piece of information (Step 602) from the student to a second computer, such as a server computer. The two computers are typically connected by a network. The second computer can include components such as the search engine and the storage medium. The piece of information can be used to identify an instructor based on information of many such instructors previously stored in the storage medium, as previously described.

After the instructor is identified, sessions between the student and the instructor can be established. The first computer can initiate (Step 604) such sessions between the student and the instructor, who probably is using a third computer for teaching the subject. The third computer again can be a thin client. In one embodiment, the step of initiating a session is sending a request to the third computer asking to have a session established.

These sessions can be during time frames determined by the users. Based on one or more of these sessions, an account can be processed by an account manager, which can be in the second computer, to collect a payment from the student.

The first computer can also transmit (Step 606) a piece of information to the second computer regarding the student. That piece of information can be used to build the student's profile and can be stored in the storage medium for identifying the student to work on a subject in the future. Note that this second transmitting step (606) does not have to be performed after the step of initiating a session (604) or the first transmitting step (602).

Note that in one embodiment, the thin client can include the determinator to determine on the type of user.

The present invention can be implemented in hardware or software or both. For example, the search engine 106 can be written in software, or can be functions performed by a special-purpose chip.

Although the present invention has been described to teach a language, other subjects can be taught by the present invention. In this situation, based on the user's identification and the user's subject of interest, the determinator can determine whether the user is an instructor or a student, based on the user's previous input.

In one embodiment, students' payments are based on the duration of time services were rendered, with the services rendered based on personal interaction. For example, the instructor is a lawyer, the student is a client, and the subject is paying taxes. In this example, the client is learning how to prepare his tax return from the lawyer. In this situation, learning covers problem solving.

In one embodiment, students use the search engine 106 to identify the desired instructors. In other words, the search engine 106 does not perform automatic matching of the students with the instructors. It is up to the students to look for the instructors. In this embodiment, the step of identifying (Step 156) is by the search engine, 106, as used by the students.

In one embodiment, the embodiment 100, or a number of components in the embodiment 100, reside in a Web server, with the server managing the sessions. In other words, the method 150, or a number of steps in the method 150, are implemented in a Web server. The server can include a HTTP server that understands HTTP or equivalent protocol.

Due to the penetration of the Web to different parts of the world, a student in South Africa can learn from an instructor in Brazil using an embodiment of the invention. Each can have a digital camera for video-conferencing. The present invention provides a medium for them to develop a personal relationship. This can create a sense of community and family for people in different parts of the world. Through learning a subject, they can share their mutual interest. Note that in one embodiment, as long as the users are using a part of their sessions to learn, they would be considered learning. In other words, the users can spend some of their connection time to chat on other areas.

In one embodiment, if the list of subjects previously in the storage medium does not include the subject of the user's interest or specialty, he can create his own subject. For example, his specialty is in making sushi, and there is no such subject in the list of subjects. He can create that subject. Next time, a student who wants to learn how to make sushi may be matched to him.

As described above, an instructor can select a student or vice versa to work on a subject. Thus, a first type of user, a student or an instructor, can identify a user of the second type based on information of many users of the second type previously stored in the storage medium. Then, the session manager can manage a session between the user of the first type using a first computer and the identified user of the second type using a second computer for learning the subject. The time to learn can be determined by the users. The account manager can process an account based on the session for collecting a payment from the user learning the subject. One piece of information about the user of the first type can also be stored in the storage medium so that he can be identified in the future to work on a subject. The present invention allows the user of the first type and the identified user of the second type to use different computers, with the two computers being connected by a network. Since the user of the first type and the user of the second type can pick the computers they want to use, they have a certain degree of freedom to pick the locations to work on the subject.

Moreover, embodiments of the present invention allow one type of user to select a user of another type to work on a subject.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-aided learning method allowing a user of the first type using a first computer to work on a subject with a user of the second type using a second computer, which is connected to the first computer by a network, with one type of users being instructors and the other type being students, the method comprising the steps of:
   if the user is of the first type, then:
      identifying the user of the second type based on information about a plurality of users of the second type in a storage medium and based on information from the user of the first type;
      managing a session between the user of the first type and the identified user of the second type to work on the subject during a time frame determined by the users; and
      processing an account based on the session for collecting a payment from the user learning the subject; and
   if the user is of the second type, then storing one piece of information about that user in the storage medium for identifying that user to work on a subject;
   such that not only the time and the locations to learn the subject can be set by the users, the user of the first type can also select the user of the second type to work on the subject;
   wherein the user of the first type may enter for storage into the storage medium a subject not previously stored in the storage medium.

2. A computer-aided method as recited in claim 1, wherein:
   each user has an identifier; and
   the method further comprises the step of determining the type of user based on at least the identifier of the user.

3. A computer-aided learning method as recited in claim 1, wherein information about the user of the second type indicates the subject the user is interested in.

4. A computer-aided learning method as recited in claim 3, wherein if the subject of interest was previously not in the storage medium, the user of the second type has the option of entering the subject into the storage medium.

5. A computer-aided learning method as recited in claim 1, wherein information about the user of the second type includes feedbacks from one or more users of the first type who has worked on a subject with that user.

6. A computer-aided learning method as recited in claim 5, wherein information about the user of the second type includes comments from that user responding to the feedbacks.

7. A computer-aided learning method as recited in claim 1, wherein information about the user of the second type includes a personal clip describing the user.

8. A computer-aided learning method as recited in claim 1, wherein:
   the information about the plurality of users of the second type is separated into categories; and
   the categories form a hierarchy.

9. A computer-aided learning method as recited in claim 1, wherein the step of identifying includes the step of matching information of the plurality of users of the second type with information from the user of the first type.

10. A computer-aided learning method as recited in claim 9, wherein the step of identifying also includes the step of generating the best match between information of the plurality of users of the second type with information from the user of the first type.

11. A computer-aided learning method as recited in claim 1, wherein the step of managing includes the step of allowing the user of the first type and the identified user of the second type to have a trial session.

12. A computer-aided learning method as recited in claim 1, wherein the step of managing includes the step of providing learning materials to the user of the first type and the identified user of the second type to learn the subject.

13. A computer-aided learning method as recited in claim 1, wherein the step of processing is based on the duration of the session.

14. A computer-aided learning method as recited in claim 1, wherein the step of processing includes the step of setting a differential management fee to charge the user learning the subject based on that user's prior usage.

15. A computer-aided learning method as recited in claim 1, wherein the step of processing includes the step of allowing the user teaching the subject to change the payment the user learning the subject has to pay.

16. A computer-aided learning method as recited in claim 1, wherein the network includes a public network.

17. A computer-aided learning method as recited in claim 1, wherein the network includes a private network.

18. A computer-aided learning method as recited in claim 17, wherein the network includes a public network.

19. A computer-aided learning method as recited in claim 1, wherein the method is implemented in a Web server.

20. A computer-aided learning method as recited in claim 1, wherein the user of the first type can identify more than one user of the second type to work on the subject together.

21. A computer-aided learning method allowing a user of the first type using a first computer to work on a subject with a user of the second type using a second computer, which is connected to the first computer by a network, with one type of users being instructors and the other type being students, the method comprising the steps of:
   identifying for the user of the first type, the user of the second type, based on information of a plurality of users of the second type in a storage medium and based on information from the user of the first type;
   managing a session between the user of the first type and the identified user of the second type to work on the subject during a time frame determined by the users; and
   processing an account based on the session for collecting a payment from the user learning the subject;
   wherein the method further comprises the step of storing one piece of information about a user in the storage medium for identifying that user to work on a subject;
   such that not only the time and the locations to work on the subject can be determined by the users, one type of user can select a user of the other type to work on the subject and the user of the first type may enter for storage into the storage medium a subject not previously stored in the storage medium.

22. A computer-aided learning method allowing a user of the first type using a first computer to work on a subject with a user of the second type using a second computer, which is connected to the first computer by network, with one type of users being instructors and the other type being students, the method comprising the steps of:

transmitting a piece of information from the user of the first type to identify the user of the second type based on information of a plurality of users of the second type in a storage medium; and initiating a session between the user of the first type and the identified user of the second type for learning the subject during a time frame determined by the users, so that based on the session, an account can be processed for collecting a payment from the user learning the subject;

wherein the method further comprises the step of transmitting a piece of information regarding the user of the first type to be stored in the storage medium for identifying that user to work on a subject;

such that not only the time and the locations to work on the subject can be determined by the users, one type of user can select a user of the other type to work on the subject and the user of the first type may enter for storage into the storage medium a subject not previously stored in the storage medium.

23. A computer-aided learning apparatus allowing a user of the first type using a first computer to work on a subject with a user of the second type using a second computer, which is connected to the first computer by a network, with one type of users being instructors and the other type being students, the apparatus comprising:

a search engine configured to identify for the user of the first type, the user of the second type based on information about a plurality of users of the second type in a storage medium and based on information from the user of the first type;

a session manager configured to manage a session between the user of the first type and the identified user of the second type for learning the subject during a time frame determined by the users;

an account manager configured to process an account based on the session for collecting a payment form the user learning the subject; and a categorizer configured to store one piece of information about a user in the storage medium for identifying that user to work on a subject;

such that not only the time and the locations to learn the subject can be set by the users, the user of the first type can also select the user of the second type to work on the subject;

wherein the user of the first type may enter for storage into the storage medium a subject not previously stored in the storage medium.

24. A computer-aided learning apparatus as recited in claim 23, wherein:

each user has an identifier; and the apparatus further comprises a determinator configured to determine the type of user based on at least the identifier of the user.

25. A computer-aided learning apparatus as recited in claim 23, wherein information about the user of the first type includes the subject the user is interested in.

26. A computer-aided learning apparatus as recited in claim 25, wherein if the subject of interest was previously not in the storage medium, the user of the first type has the option of entering the subject into the storage medium.

27. A computer-aided learning apparatus as recited in claim 23, wherein information about the user of the first type includes feedbacks from one or more users of the second type who has worked on a subject with that user.

28. A computer-aided learning apparatus as recited in claim 27, wherein information about the user of the first type includes comments from that user responding to the feedbacks.

29. A computer-aided learning apparatus as recited in claim 23, wherein information about the user of the first type includes a personal clip describing the user.

30. A computer-aided learning apparatus as recited in claim 23, wherein: the information about the plurality of users of the second type is separated into categories; and the categories form a hierarchy.

31. A computer-aided learning apparatus as recited in claim 23, wherein the search engine is also configured to match information of the plurality of users of the second type with information from the user of the first type.

32. A computer-aided learning apparatus as recited in claim 31, wherein the search engine is also configured to generate the best match between information of the plurality of users of the second type with information from the user of the first type.

33. A computer-aided learning apparatus as recited in claim 23, wherein the session manager is configured to allow the user of the first type and the identified user of the second type to have a trial session.

34. A computer-aided learning apparatus as recited in claim 23, wherein the session manager is configured to provide learning materials to the user of the first type and the identified user of the second type to learn the subject.

35. A computer-aided learning apparatus as recited in claim 23, wherein the account manager processes the account based on the duration of the session.

36. A computer-aided learning apparatus as recited in claim 23, wherein the account manager is configured to set a differential management fee to charge the user based on that user's prior usage.

37. A computer-aided learning apparatus as recited in claim 23, wherein the account manager is configured to allow the user teaching the subject to change the payment the user learning the subject has to pay.

38. A computer-aided learning apparatus as recited in claim 23, wherein the network includes a public network.

39. A computer-aided learning apparatus as recited in claim 23, wherein the network includes a private network.

40. A computer-aided learning apparatus as recited in claim 39, wherein the network includes a public network.

41. A computer-aided learning apparatus as recited in claim 23, wherein the apparatus is implemented in a Web server.

42. A computer-aided learning apparatus as recited in claim 23, wherein the user of the first type can identify more than one user of the second type to work on the subject together.

43. A computer-aided learning apparatus allowing for a user of the first type to work on a subject with a user of the second type using a computer, which is connected to the apparatus by a network, with one type of users being instructors and the other type being students, the apparatus configured to perform a method comprising the steps of:

transmitting a piece of information from the user of the first type to identify the user of the second type based on information of a plurality of users of the second type in a storage medium, transmitting a piece of information regarding the user of the first type to be stored in the storage medium for identifying that user to work on a subject; and initiating a session between the user of the first type and the identified user of the second type for learning the subject during a time frame determined by the users, so that based on the session an account can be processed for collecting a payment from the user learning the subject;

such that not only the time and the locations to work on the subject can be determined by the users, one type of user can select a user of the other type to work on the subject;

wherein the user of the first type may enter for storage into the storage medium a subject not previously stored in the storage medium.

44. A computer-aided learning method allowing a user of the first type using a first computer to work on a subject with a user of the second type using a second computer, which is connected to the first computer by a network, with one type of user being instructors and the other type being students, the method comprising the steps of:

if the user is a professor, then:
identifying a student based on information about a plurality of students in a storage medium and based on information from the professor;
managing a session between the professor and the identified student to work on the subject during a time frame determined by the users; and
processing an account based on the session for collecting a payment from the student learning the subject; and if the user is a student, then storing one piece of information about that user in the storage medium for identifying that user to work on a subject;

such that not only the time and the locations to learn the subject can be set by the users, the student can also select the professor to work on the subject;

wherein information about the student includes feedback from one or more instructors who have worked on a subject with that user.

45. A computer-aided learning method allowing a user of the first type using a first computer to work on a subject with a user of the second type using a second computer, which is connected to the first computer by a network, with one type of users being instructors and the other type being students, the method comprising the steps of:

if the user is of the first type, then:
identifying the user of the second type based on information about a plurality of users of the second type in a storage medium and based on information from the user of the first type;
managing a session between the user of the first type and the identified user of the second type to work on the subject during a time frame determined by the users; and processing an account based on the session for collecting a payment from the user learning the subject; and if the user is of the second type, then storing one piece of information about that user in the storage medium for identifying that user to work on a subject;

such that not only the time and the locations to learn the subject can be set by the users, the user of the first type can also select the user of the second type to work on the subject;

wherein the step of managing includes the step of allowing the user of the first type and the identified user of the second type to have a trial session.

* * * * *